D. W. JENKINS.
DETACHABLE TOOTH SAW.
APPLICATION FILED MAY 23, 1917.
1,337,016.
Patented Apr. 13, 1920.
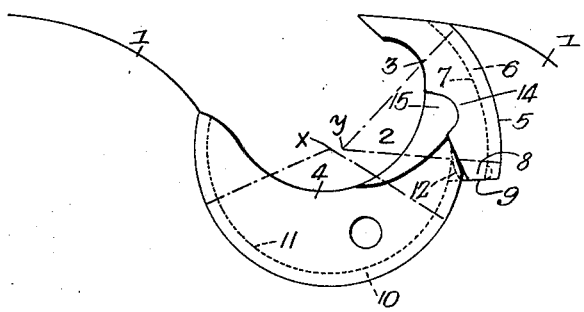
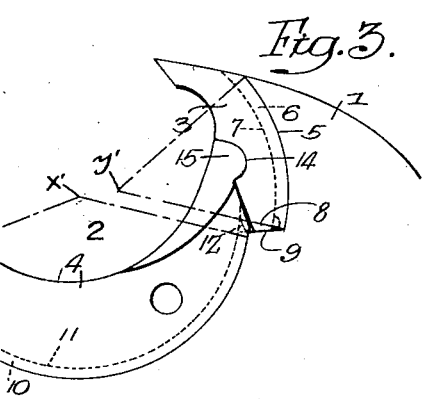
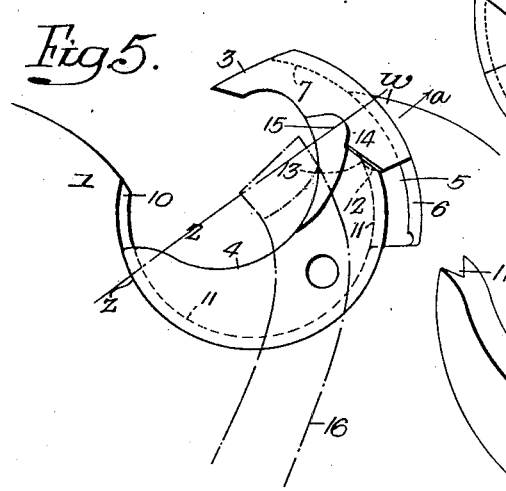
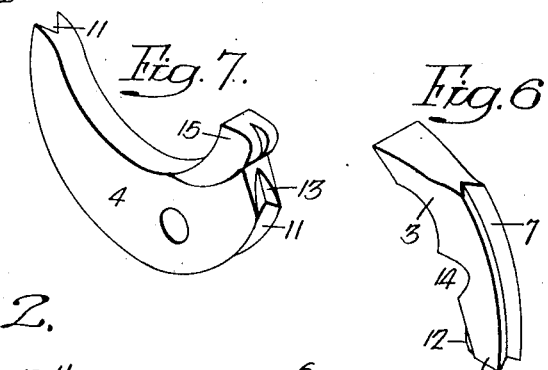
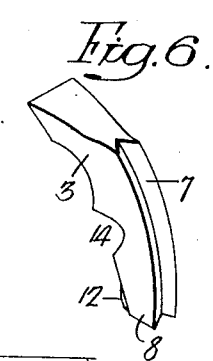
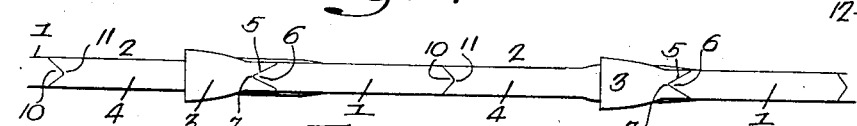
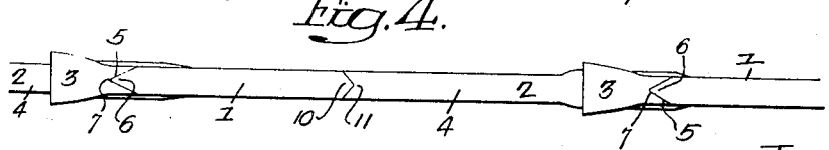
Inventor—
David W. Jenkins.
by his Attorneys—
Howson & Howson

UNITED STATES PATENT OFFICE.

DAVID W. JENKINS, OF SEATTLE, WASHINGTON, ASSIGNOR TO HENRY DISSTON & SONS, INCORPORATED, OF PHILADELPHIA, PENNSYLVANIA, A CORPORATION OF PENNSYLVANIA.

DETACHABLE-TOOTH SAW.

1,337,016.      Specification of Letters Patent.      Patented Apr. 13, 1920.

Application filed May 23, 1917. Serial No. 170,417.

*To all whom it may concern:*

Be it known that I, DAVID W. JENKINS, a citizen of the United States, and a resident of Seattle, county of King, State of Washington, have invented certain Improvements in Detachable-Tooth Saws, of which the following is a specification.

My invention relates to saws having detachable teeth secured to the blade by holders, and it comprises certain improvements in circular saws whereby I am enabled to use teeth of the same size and shape with different sized holders or locking members adapted to gullets of correspondingly different sizes.

One object of my invention is to design the parts so that while it will take considerable pressure to draw the tooth past a portion of its seat and impart tension to the blade in applying the tooth, such tension will be relieved as soon as the tooth assumes its seat with the locking member or holder in position; thereby relieving the blade and particularly the periphery thereof from undue strains when the teeth are in the active cutting position.

A further object of my invention is to make the teeth of one size and shape so as to be interchangeable with saws having holders varying in size adapted to gullets of corresponding variance in size.

These and other features of my invention are more fully described hereinafter, reference being had to the accompanying drawings, in which:

Figure 1, is a side view of sufficient of a saw blade to show one tooth in position with a small holder.

Fig. 2, is a plan view of the same.

Fig. 3, is a view similar to Fig. 1, showing a larger holder.

Fig. 4, is a plan view of the same.

Fig. 5, is a view showing the manner of inserting a tooth and holder in the recess of a saw blade.

Fig. 6, is a perspective view of one of the teeth, and

Fig. 7, is a perspective view of one of the holders.

Referring to the drawings, 1 is the blade or body of a circular saw, having a recess or gullet 2 for the reception of a tooth 3 and a locking member or holder 4. The tooth is adapted to an offset portion 5 of the gullet, and the back wall of this offset portion has a V-shaped rib 6: the back of the tooth 5 being grooved at 7 to engage said rib 6. The base 8 of the tooth rests on a shoulder 9 at the bottom of the offset portion 5 of the recess 2, and the margin of the main recess or gullet follows the arc of a circle struck from a center $x$.

The holder 4 is shaped to fit the curved wall of the recess 2, as shown in Figs. 1, 2 and 5, which curved wall is provided with a rib 10, and the holder has a groove 11 to receive the rib. At the base of the tooth and disposed toward the front of the same is a short tapered rib 12, adapted to a recess 13 in the holder, which recess forms a continuation of the recess 11. The tooth is also provided with a curved notch or recess 14 adapted to receive a lug 15 on one end of the holder 4. This engagement of the lug of the holder with the tooth allows the latter to be drawn into the recess on turning the holder, in the manner indicated in Fig. 5.

The feature of this invention is the use of teeth of the same size and shape with various sized locking members or holders in various sized gullets. To this end, the curve of the shouldered offset recess receiving the tooth is the same in all instances without reference whatever to the size of the gullet, or the holder which secures the tooth in place. The curve of the holder and gullet, of course, bears a certain relation to the curve of the shouldered recess receiving the tooth; the centers from which they are struck being eccentric to each other and set in such relation thereto that when a tooth and holder are coupled together as shown in Fig. 5, movement of the holder will force the tooth into place. By reason of this eccentricity, the offset recess receiving the tooth is slightly narrower at the top than at the base; hence when the tooth is applied, considerable pressure is exerted upon the part of the blade immediately behind the tooth; setting up a tension that would be objectionable if not relieved, but the shape of the tooth is such that when it is finally seated, all of this tension is relieved, and by reason of this condition the tooth is not only retained in place by the holder, but also locked in position by the blade.

It will be noticed, upon referring to Fig. 1, showing the smaller recesses or gullets, that the wall of the offset recess 5 follows the arc of a circle struck from a point $y$ eccentric to, and in the present instance, below the point $x$ (from which the arc of the recess 2 is struck), and that in Fig. 3, showing the larger recesses or gullets, the wall of the offset recess 5, while of the same size, follows the arc of a circle struck from a point $y'$ eccentric to, and, in the present instance, above the point $x'$ (from which the arc of the recess 2 is struck.)

In each instance, the tooth and holder are in such relationship and proportion that they may be coupled together and turned into place by a tool 16, in the manner indicated in Fig. 5. When set in place and partially turned, the parts are jammed between the point $w$ of the blade adjacent the offset recess 5, and the part $z$ of the blade adjacent the marginal wall of the recess 2, (a line drawn through these parts will pass through the lug 15), and on continuing the movement of said tool 16, tension will be applied to the portion $w$ of the blade and, in addition, slight movement in the direction of the arrow $a$ will be imparted thereto, sufficient to permit the tooth to slide into its seat or recess on completing the movement of the tool 16 until such tooth rests against the shoulder 9. The tooth is of such shape that when pressure is applied by means of the tool 16, the tooth will slide readily from the position shown in Fig. 5, to the position shown in Fig. 1; pressure being required owing to the fact that the back of the offset recess 5 is slightly off center, as illustrated in Figs. 1 and 3. But when the tooth is in its seat the portion $w$ of the blade is relieved from all undue tension strains.

This is an important feature of my invention. In cases where the tension strains are not relieved, as in the ordinary blades having insertible saw teeth, the blade has to be hammered so as to relieve the pressure which would otherwise cause the blade to buckle. Furthermore, by making the recess in the manner shown, in which the curve of the back of the offset portion is eccentric to the curve of the main portion of the recess, the size of the holder may be changed without interfering with the fit of the tooth in its seat in the offset recess; hence teeth of the same size can be mounted in saws having gullets and holders of different sizes, and interchanged therewith as may be desired. This is quite important as, in many saw mills, there are circular saws of different sizes, and the usual practice heretofore has been to have a series of detachable teeth for each size holder, whereas by the use of my invention, all of the teeth are readily interchangeable and may be used with a saw of any size, and with holders of any size.

The shape of the lug carried by the holder and fitting the notch in the tooth, the latter having the same contour as the lug, is one that has been developed especially for this structure. It will be noted that it does not follow the arc of a circle, but has a curved portion joined by substantially straight portions; a construction that has been found in practice to work exceedingly well, both in setting the tooth in place and holding it there when seated.

I claim:

1. A saw blade having a circularly curved recess offset at the back and the curve of the back of the recess approaching the circle of the curve of the remainder of the recess at the edge of the blade, a tooth having a back adapted to said offset, and a holder adapted to said recess, the arrangement being such that when the holder is turned the tooth will first be drawn into the offset with a deflecting pressure against the wall thereof at the edge of the blade, and as the tooth is moved into its seating position the said pressure is relaxed and the tooth becomes locked in place by the return of the deflected edge of the saw blade to normal position.

2. The combination of a saw blade having a circularly curved recess, said recess being offset at the back, the curve at the back of said recess approaching the circle of the curve of the remainder of the recess, said blade having an abutting shoulder extending from the circular wall of the recess and forming the base of said offset portion, a holder adapted to said recess, and a tooth having a back adapted to the offset portion of the recess, the arrangement of said parts being such that when the holder is turned the tooth will be drawn into the offset with a binding pressure against the wall thereof at the edge of the blade and then as said tooth moves into its seating position the pressure on the tooth and on the wall of the offset at the edge of the blade will be automatically relieved and the tooth will become locked in place by the blade.

DAVID W. JENKINS.